Patented Apr. 22, 1941

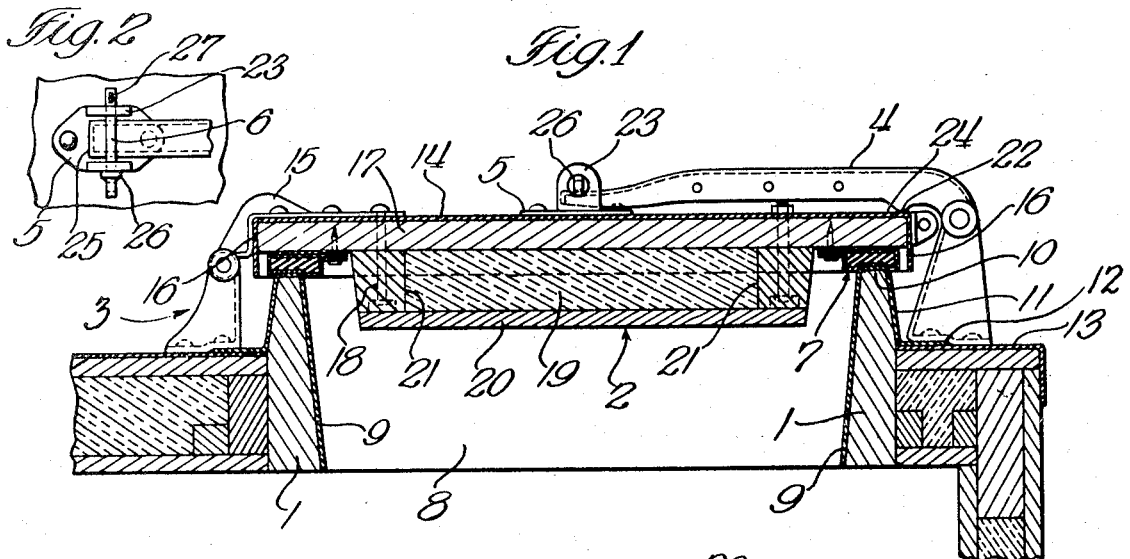
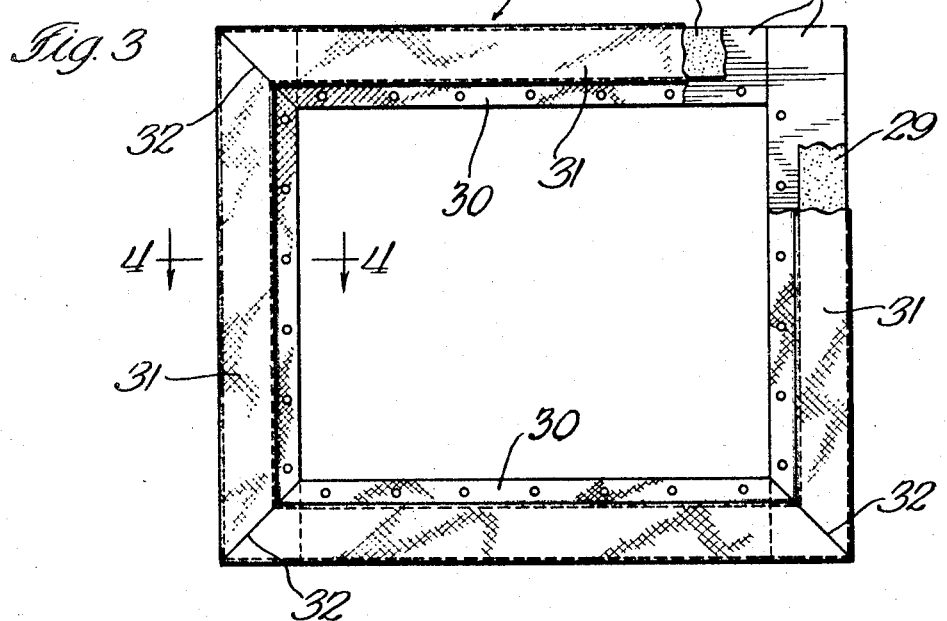
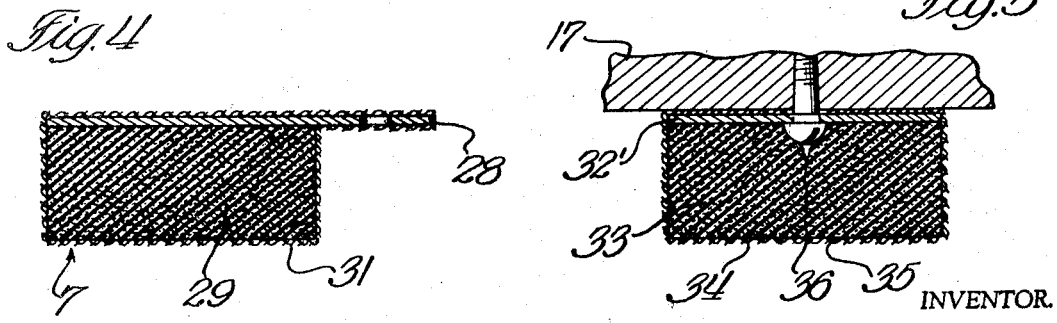

2,239,269

UNITED STATES PATENT OFFICE 2,239,269

REFRIGERATOR CAR HATCH CLOSURE

John S. Lundvall, Chicago, Ill., assignor to Union Asbestos & Rubber Company, Chicago, Ill., a corporation of Illinois Application March 16, 1939, Serial No. 262,113

2 Claims. (Cl. 20—69)

The invention relates to hatch closures and more particularly to hatch closures for refrigerator cars wherein a resilient gasket is used as a sealing means.

One object of the invention is to provide a combined hatch cover and gasket which will function as a unit, thereby reducing the number of parts.

Another object is to provide a resilient gasket having a stiffening member associated therewith, whereby the gasket will lie flat against its mounting member.

Another object is to provide a resilient gasket having a relatively wide contact face of a construction requiring a relatively small mounting space.

Another object is to provide a resilient gasket having a covering to protect it from deteriorating elements.

Another object is to provide a resilient gasket adapted for compression between two members without chafing or friction during the compressing of the gasket or during the release of the gasket from compression.

Another object is the provision of a resilient gasket which may be secured to its mounting by means of a single row of fasteners, such as screws or nails, whereby the space required for mounting the gasket may be no more or slightly more than the width of the gasket member.

Another object is to provide a resilient gasket which may be fabricated separately and secured to its mounting member without adjusting or fitting the gasket.

Another object is the provision of a gasket which is secured to the closure in a manner to protect the gasket from damage or injury, as by the dropping of ice blocks or other objects upon gasket, by means of protection members at each side of the mounted gasket.

Another object is the provision of a gasket which may be made of resilient material, such as sponge rubber, with a covering of fabric or other suitable material to prevent the material from adhering to the member or members between which gasket is compressed.

Fig. 1 of the accompanying drawing shows a vertical section through the hatch, hatch closure and gasket, with the closure shown in closed and locked position, with the gasket under compression.

Fig. 2 shows a fragmentary plan view of locking means illustrated in Fig. 1.

Fig. 3 shows a plan view of the gasket illustrated in Fig. 1, partly broken at one corner to show the relative positions of the component parts of the gasket.

Fig. 4 shows an enlarged cross-sectional view of the gasket, taken on line 4—4 of Fig. 3, while Fig. 5 shows an enlarged cross-sectional view of a modification of the gasket.

To illustrate my invention I have shown in Fig. 1 a hatch frame 1, a hatch cover 2, cover hinge means 3, cover securing and locking arm 4, locking member 5, locking pin 6 and gasket 7, secured in position on hatch cover. The hatch frame 1 may comprise a substantially rectangular hopper-like frame of wood construction and may have a hopper-like metal frame or lining 8 embracing frame 1 at each side of the hatch frame. The metal frame or lining 8 may comprise side walls 9 embracing the side walls of hatch frame 1 provided with outwardly extending substantially horizontal wall portions 10 and a downwardly wall portion 11, spaced outwardly from and substantially parallel to wall 9, terminating in a laterally extending flange member 12 to provide securing means for frame 8 on car structure 13. Metal frame 8 may be made of sheet metal or may be of cast construction. While I have shown a metal hatch lining 8 overlying wooden hatch frame 1 it is to be understood that my invention will function whether this metal lining is used or not, and the hatch frame may be of wood construction only or it may be constructed of metal only, but where metal is used for the frame it is preferable that wood or other suitable non-conductor of heat be used to insulate the metal.

I show, in Fig. 1, a hatch cover 2 which may comprise a metal box-like member 14 pivotally mounted adjacent a side of the hatchway by means of hinges 15 which may be mounted on hatch frame 1 or to an adjacent portion of car structure. Member 14 may be provided with depending marginal walls 16 and may be provided with a member 17, of wood or other non-conductor of heat, secured to the under side of member 14 in substantially parallel, abutting relationship therewith, intermediate depending walls 16, and secured thereto by means of bolts 18 or other suitable fastening means, said member 17 providing insulating means for member 14 and mounting means for gasket 7. Member 17 may be provided with a depending insulating member 19 which may comprise a wall portion 20 in parallel, spaced apart, underlying relation to member 17 cooperatively secured to member 17 by means of a frame member 21 intermediate members 17 and 20 providing a space intermediate members 17 and 20, and between opposite members 21—21, which space is preferably provided with suitable insulating material. Depending insulating member 19 preferably extends below member 17 and wall portion 10 of metal lining 8 (as shown in Fig. 1) and is spaced inwardly from depending walls 16, providing a marginal mounting portion on member 17 for gasket 7, intermediate depending walls 16 and member 19.

While I show cover 2 of combined wood and metal construction it may be made of wood, without the metal member, or it may be made of metal only. The cover 2 need not necessarily be pivoted. The depending walls 16 preferably terminate below member 17, providing a protection member for gasket 7 along its outer marginal portion.

Cover locking arm 4 comprises an inverted U-shaped bar pivotally mounted adjacent one of its ends in a mounting secured to car structure 13, adjacent a side of hatch frame 1, and adapted for swinging movement to a position substantially parallel to the plane of and in adjacent, overlying relationship with cover 14, and provided intermediate its ends with an abutment 22, adapted to engage cover 2 adjacent its free marginal portion 24 to force the cover tightly closed, with gasket under compression. A locking member 5 may be secured to cover 2 at a point substantially coincident with the free end 25 of locking arm 4, when said locking arm 4 is in cover locking position, and may comprise a bracket member having spaced apart, upstanding, apertured lugs 23, between which the end 25 of locking arm 4 may be positioned and locked in cover locking position by means of a locking pin 6, which may be inserted through the apertures in lugs 23, in overlying, adjacent relation to end 25 of locking arm 4. Locking pin 6 may be provided adjacent one of its ends with an enlarged portion 26 to limit its longitudinal movement in one direction and may be provided at its opposite end with an aperture 27, for the insertion of the conventional car seal strap, to prevent unauthorized use of the locking means. While I have shown the locking arm mounted upon a portion of the car structure and have shown the locking means for the locking arm mounted upon the cover, this order may be reversed without in any manner affecting the efficiency of my invention and while I have shown and described one form of locking member 5 any of the conventional locking means may be used to secure the locking arm 4 in closed position. Where abutment 22 engages cover 2 a suitable chafe plate or wear plate may be secured to cover to prevent wear at this point and the plate may be removably secured to cover to provide means for the use of plates of various thicknesses to regulate the amount of compression of the gasket.

Gasket 7, as shown in Figures 3 and 4, comprises a stiffening frame 28 of relatively thin material, a sponge-rubber member 29 superimposed upon frame 28, the outer margin of member 28 being coincident with outer margin of member 29. The width of member 29 may be less than the width of member 28 providing an inwardly extending lateral marginal portion 30, on frame 28, which may be used to secure the fabricated gasket to its carrying member by means of screws, nails or other suitable fastening means extending through marginal portion 30 into the carrying member. Member 29 may be secured in position on frame 28 by means of rubber cement or other suitable adhesive. A covering 31 may be wrapped around associated members 28 and 29 as shown in Fig. 4 and may comprise a continuous fabric member in parallel, adjacent relationship with the outer surface area or contour of associated members 28 and 29, the marginal edges of covering 31 being coincident with inner margin of and on opposite sides of frame 28. The covering 31 may be cooperatively secured to outer surface area of associated members 28 and 29 by means of a suitable cement or other adhesive agent.

In Fig. 3, I show frame 28 as comprising four side members each member having its end portions in abutting relationship with adjacent members. These members may be cooperatively secured at their abutting portions by welding or other suitable means.

Frame 28 may be made of unitary construction, as of cast metal or by blanking out of the inner portion of a sheet of metal but I prefer to use a frame of built-up construction, as shown in Fig. 3, due to its economy. Frame 28 may be made of any suitable material having the qualities of rigidity with minimum thickness such as sheet metal, fibre board, Bakelite or aluminum but I prefer to use sheet metal due to its relatively low cost, rigidity, thinness and durability.

Member 29 may be made of felt, rubber or any suitable resilient material but I prefer to use sponge-rubber owing to its compressibility over a given area by the use of less compressive force than would be required to compress other resilient materials of greater density over the same area, and because of the inherent quality of sponge-rubber to return to its original shape upon removal of compressing member.

The end portions of members 28, 29 and 31 may be mitered adjacent their points of convergence with adjacent members 28, 29 and 31 respectively. Covering 31 may be of fabric, such as duck, canvas, woven asbestos or any suitable material and I preferably use a fabric which has been impregnated with a water-proofing compound in order to protect the resilient member 29 from light, moisture and corrosive elements. Member 29 may be cooperatively secured to member 28 without the use of a fabric covering or may be secured directly to its carrying member without stiffening member 28, but in view of experience, I prefer to use a fabric covering to protect member 29 from the elements and to prevent same from damage as by the member 29 adhering to the compressing member, as wall portion 10 of frame 8.

Gasket 7 shown in Figures 3 and 4 may be secured to its mounting member by means of a single row of screws, nails or other suitable fasteners applied through marginal securing portion 30 of gasket 7 and stiffening member 28 will hold the opposite or outer marginal portion of gasket 7 in substantially abutting relationship with adjacent portion of mounting member 17, thereby effecting an economy of space required to mount the gasket.

The modification of gasket shown in Fig. 5 may be applied to its carrying member within a smaller mounting space than that required to mount gasket 7. Gasket shown in Fig. 5 comprises a frame member 32' which may be of relatively thin metal or other rigid material, a resilient member 33 of substantially the same width as member 32' and a fabric covering 34 which substantially encloses associated members 32' and 33. Member 33 may be in parallel, abutting relationship with member 32' and may be cooperatively secured thereto by a suitable adhesive agent. The covering 34 may entirely enclose associated members 32' and 33 or may enclose the outer surface area of member 33 with the marginal portions of covering 34 in abutting, overlapping relationship with outer surface of marginal portions of member 32', the covering 34 being secured to associated members 32' and 33 by means of a suitable adhesive agent. Member 32' may have a longitudinally extending row or series of apertures therein and the parallel, spaced apart portion of covering 34 may also have a longitudinally extending row of apertures 35 therein in register with the apertures in member 32'. Gasket structure shown in Fig. 5 may be mounted on its mounting member by means of a series of screws or other fastening means which are driven through member 33 in alignment with registering apertures 35 in covering 34 and member 32', by perforating member 33 as indicated at 36. After the fastening means are driven home the aperture 35 may be sealed as by applying rubber cement, asphalt, or other sealing compound which will adhere to member 33 and the peripheral edge portion of aperture 35.

The advantages of the covering for the rubber gasket will be apparent to those familiar with the use of rubber and it will be seen that said covering protects the rubber from light, heat and elements which have a deteriorating effect on rubber, as well as to protect the rubber from being torn and otherwise damaged, as by gasket adhering to the compressing member when kept under compression for extended periods, in which case the rubber may be torn in opening the cover. Uncovered rubber members of so-called solid rubber become brittle and lose their resiliency.

The stiffening member which I secure to my resilient gasket member is adapted to hold the gasket in abutting relationship with its mounting member by the use of a single row of fasteners applied longitudinally of said stiffening member, whereas to secure a flexible gasket to its mounting member would require a row of fasteners along each margin of the gasket if the gasket were to be secured in the essential flatwise position on mounting member, requiring a larger mounting area.

I have herein shown and described what I now consider the preferred manner of carrying out my invention, but the same is merely illustrative and I contemplate all changes and modifications that come within the scope of the claims appended hereto.

I claim:
1. A weatherstrip comprising a substantially flat strip of relatively rigid material, a substantially flat strip of resilient rubber in flatwise abutting engagement with and having one of its longitudinal margins inwardly spaced from the adjacent longitudinal edge of said first named strip, and means for securing said rubber in flatwise engagement with said first named strip comprising a flexible sheathing embracing the outer surface of the abutting strips and having its margins adhesively secured to said surface; and means for securing said weatherstrip in flatwise engagement with a mounting comprising a plurality of apertures in said first named strip intermediate said edge and said rubber adapted to receive fastening members having holding engagement with said mounting whereby said first named strip will be affixed in flatwise relatively non-flexing engagement with said mounting.

2. A weatherstrip comprising a substantially flat strip of relatively rigid material, a substantially flat strip of resilient rubber in flatwise abutting engagement with and having one of its longitudinal margins inwardly spaced from the adjacent longitudinal edge of said first named strip, and means for securing said rubber in flatwise engagement with said first named strip comprising a flexible sheathing embracing the outer surface of the abutting strips and having its margins adhesively secured to said surface; and means for mounting said weatherstrip in flatwise engagement with a mounting comprising a plurality of apertures in said first named strip intermediate said edge and said rubber adapted to receive fastening members having holding engagement with said mounting whereby said first named strip will be affixed in flatwise relatively non-flexing engagement with said mounting, said rubber being adapted to be compressed by a force applied in a direction substantially perpendicular to the plane of said rubber and to substantially the entire area of one of the flat sides of said rubber.

JOHN S. LUNDVALL.